(12) United States Patent
Jang (10) Patent No.: US 12,274,319 B2
(45) Date of Patent: Apr. 15, 2025

(54) IOT-BASED SMART THERMAL WEAR (71) Applicant: JANG EUN FNC CO., LTD., Seoul (KR)

(72) Inventor: Eun Jeong Jang, Seoul (KR)

(73) Assignee: JANG EUN FNC CO., LTD., Seoul (KR)

( * ) Notice: Subject to any disclaimer, the term of this patent is extended or adjusted under 35 U.S.C. 154(b) by 1 day.

(21) Appl. No.: 18/265,342

(22) PCT Filed: Dec. 18, 2020

(86) PCT No.: PCT/KR2020/018635
§ 371 (c)(1),
(2) Date: Jun. 5, 2023

(87) PCT Pub. No.: WO2022/131405
PCT Pub. Date: Jun. 23, 2022

(65) Prior Publication Data
US 2024/0049821 A1    Feb. 15, 2024

(30) Foreign Application Priority Data

Dec. 15, 2020    (KR) .......................... 10-2020-0175860

(51) Int. Cl.
*A41D 31/06*    (2019.01)
*A41D 1/04*    (2006.01)
*G16Y 40/30*    (2020.01)

(52) U.S. Cl.
CPC .............. *A41D 31/06* (2019.02); *A41D 1/04* (2013.01); *G16Y 40/30* (2020.01); *A41D 2400/12* (2013.01)

(58) Field of Classification Search
CPC ...... A41D 31/06; A41D 1/04; A41D 2400/12; A41D 13/0051; A41D 13/0058;
(Continued)

(56) References Cited

U.S. PATENT DOCUMENTS 4,589,423 A * 5/1986 Turner .................. A61N 1/403
607/154
6,066,164 A * 5/2000 Macher .................... H05B 1/02
607/152
(Continued)

FOREIGN PATENT DOCUMENTS

JP    2014-103116 A    6/2014
KR    20-0333706 Y1    11/2003
(Continued)

OTHER PUBLICATIONS

American Heritage® Dictionary of the English Language, Fifth Edition. S.v. "vest." Retrieved Aug. 13, 2024 from https://www.thefreedictionary.com/vest (Year: 2024).*

*Primary Examiner* — Robert H Muromoto, Jr.
(74) *Attorney, Agent, or Firm* — Bridgeway IP Law Group, PLLC; Sang Ho Lee; Hyun Woo Shin (57) ABSTRACT

An IoT-based smart thermal wear includes thermal material that retains heat allowing wearers to work more efficiently and lower any risk of accidents, the IoT-based smart thermal wear being linked to a smart device and comprising an outer member, inner member, heat-insulating filler, heating-producing material, power unit, and a control unit so as to facilitate effective temperature control.

8 Claims, 7 Drawing Sheets

(58) Field of Classification Search
CPC .... A41D 1/002; A41D 2400/10; G16Y 40/30; G16Y 40/10; H02J 2207/30; H02J 7/0045; H02J 7/02; H05B 2203/036; H05B 3/145; H05B 3/347; H05B 3/342; H05B 3/80

See application file for complete search history.

(56) References Cited

U.S. PATENT DOCUMENTS

| | | | | |
|---|---|---|---|---|
| 6,486,452 | B2* | 11/2002 | Loyd, Sr. | A61F 7/007 219/528 |
| 6,599,659 | B1* | 7/2003 | Endo | H01M 4/667 429/300 |
| 6,608,464 | B1* | 8/2003 | Lew | H02J 50/005 320/108 |
| 6,840,955 | B2* | 1/2005 | Ein | A61F 7/007 607/108 |
| 7,022,950 | B2* | 4/2006 | Haas | A61F 7/007 219/217 |
| 7,494,945 | B2* | 2/2009 | Moreshead | A41D 31/12 442/228 |
| 8,074,373 | B2* | 12/2011 | Macher | A43B 3/0031 36/43 |
| 8,170,685 | B2* | 5/2012 | Docherty | A61F 7/007 219/217 |
| 10,257,884 | B2* | 4/2019 | Kuwabara | H05B 1/0233 |
| 10,571,642 | B1* | 2/2020 | Cohen | H01R 4/022 |
| 11,297,693 | B2* | 4/2022 | Zhang | A41D 13/0053 |
| 11,744,298 | B2* | 9/2023 | McIntyre | A41D 1/005 126/204 |
| 2002/0153367 | A1* | 10/2002 | Haas, Jr. | H05B 3/342 338/307 |
| 2003/0139142 | A1* | 7/2003 | Wang | H04B 1/036 219/209 |
| 2004/0118831 | A1* | 6/2004 | Martin | A43B 3/35 219/217 |
| 2004/0238527 | A1* | 12/2004 | Ozawa | H05B 3/36 219/544 |
| 2005/0192129 | A1* | 9/2005 | Kuwabara | A63B 60/46 473/520 |
| 2006/0060576 | A1* | 3/2006 | Haas | A61F 7/007 219/543 |
| 2008/0079565 | A1* | 4/2008 | Koyama | H01L 23/66 340/539.1 |
| 2011/0128726 | A1* | 6/2011 | Moreshead | H05B 3/347 362/183 |
| 2011/0130813 | A1* | 6/2011 | Moreshead | D03D 15/46 607/112 |
| 2017/0027168 | A1* | 2/2017 | Heath | A61P 17/00 |
| 2017/0340028 | A1* | 11/2017 | Roh | A41D 1/06 |
| 2018/0352877 | A1* | 12/2018 | Chung | H05B 1/0272 |
| 2019/0150521 | A1* | 5/2019 | Pai | A41B 9/04 |
| 2019/0208836 | A1* | 7/2019 | Demers | H05B 3/342 |
| 2021/0045468 | A1* | 2/2021 | Edwards | H05B 1/0272 |
| 2021/0219632 | A1* | 7/2021 | Bogdanovich | A41D 13/0053 |

FOREIGN PATENT DOCUMENTS

| | | |
|---|---|---|
| KR | 10-2004-0001071 A | 1/2004 |
| KR | 10-0984504 B1 | 9/2010 |
| KR | 10-1632433 B1 | 7/2016 |
| KR | 10-1747247 B1 | 6/2017 |

* cited by examiner

IOT-BASED SMART THERMAL WEAR

TECHNICAL FIELD

The present invention relates to Internal of Things (IoT)-based smart thermal wear, and more particularly, to IoT-based smart thermal wear including a thermal member to maintain warmth to increase work efficiency of a wearer and reduce the risk of disaster and including an outer member, an inner member, a heat insulation filler, a heating element, a power supply unit, and a controller to efficiently adjust a temperature while linked with a smart device.

BACKGROUND ART

In general, in the cold winter, thick winter clothes are worn to keep body temperature warm, and these winter clothes are made of yarn fibers such as pure wool in various manners.

Accordingly, since winter clothes should be manufactured as clothes having a considerable weight, wearers in situations in which high activity is required or persons having jobs having such characteristics may not easily wear the clothes. In recent years, in order to solve this problem, thermal vests or thermal wear have been disclosed.

In general, thermal vests actively generate heat, and similarly, resistance heating elements made of metal composite yarns are inserted into required parts such as jackets, vests, pants, shoes, socks, or gloves with heating fingers.

However, the thermal wear according to the related art is uncomfortable to wear, cannot be practically washed, and is not environmentally friendly.

Here, when wearers wear the thermal wear, an internal temperature cannot be adjusted at the right time, and thus the wearers frequently suffer from burns or complain of discomfort due to high temperatures.

RELATED ART DOCUMENT

Patent Document (Patent Document 1) Korean Patent Registration No. 10-1632433 (registered on Jun. 15, 2016)

DISCLOSURE

Technical Problem

The present invention is directed to providing an Internet of Things (IoT)-based smart thermal wear including a thermal member to maintain warmth to increase work efficiency of a wearer and reduce the risk of disaster and including an outer member, an inner member, a heat insulation filler, a heating element, a power supply unit, and a controller to efficiently adjust a temperature while linked with a smart device.

The present invention is directed to also providing IoT-based smart thermal wear in which an outer member (100) is provided in which arm insertion holes (110) are arranged on left and right sides and a neck insertion hole (120) is formed at a center of an upper portion thereof and which is made of a fabric material so that the outer member (100) is opened or closed by an opening or closing unit (130) from top to bottom at a central position, an inner member (200) is provided in which the inner member (200) has the size and structure corresponding to the outer member (100) and is coupled to the outer member (100) inside the outer member (100) and which is made of a fabric material so that the inner member (200) is in contact with the underwear or the skin of the wearer, a heat insulating filler (300) is provided which fills an accommodation space (310) that is a space formed in the back and front of the wearer between the outer member (100) and the inner member (200), a heating element accommodation pocket (400) is provided which is disposed in the inner member (200) toward the wearer or provided in the accommodation space (310), a heating element (500) is provided which is accommodated in the heating element accommodation pocket (400) and may be input into or output from the heating element accommodation pocket (400), a power supply unit (600) is provided which supplies power to the heating element (500), a power accommodation pocket (700) is provided which is disposed in the outer member (100) or the inner member (200) so that the power supply unit (600) may be input thereinto or output therefrom, a wire guide member (800) is provided which connects the power of the power supply unit (600) to the heating element (500), and a controller (900) is provided which turns on or off the power supply unit (600) or transmits a strength control signal, and thus the IoT-based smart thermal wear is convenient to wash, lightweight, and efficient.

The present invention is directed to also providing IoT-based smart thermal wear in which an adjustment switch (910) linked with the controller (900) includes a casing (911) forming an external shape that a user may grip with one hand and a button switch (912) disposed on a front portion of the casing (911), a surface of the button switch (912) is provided with a protrusion mark (912a) so that the user may grasp a position of the heating element (500) using a tactile sense and thus manipulation thereof is efficient, and the controller (900) adjusts the power supply unit (600) while linked with the smart device through the first and second communication modules (920) and (930), and thus use thereof is efficient.

Meanwhile, the aspects to be achieved in the present invention are not limited to the aspects described above, and those skilled in the art to which the present invention pertains will clearly understand other aspects not described above from the following description.

Technical Solution

An Internet of Things (IoT)-based smart thermal wear may include an outer member (100) in which arm insertion holes (110) are arranged on left and right sides thereof and a neck insertion hole (120) is formed at a center of an upper portion thereof and which is made of a fabric material so that the outer member (100) is opened or closed by an opening or closing unit (130) from top to bottom at a central position.

The IoT-based smart thermal wear may include an inner member (200) in which the inner member (200) has the size and structure corresponding to the outer member (100) and is coupled to the outer member (100) inside the outer member (100) and which is made of a fabric material so that the inner member (200) is in contact with underwear or a skin of a wearer.

The IoT-based smart thermal wear may include a heat insulating filler (300) that fills an accommodation space (310) that is a space formed in back and front of the wearer between the outer member (100) and the inner member (200).

The IoT-based smart thermal wear may include a heating element accommodation pocket (400) disposed in the inner member (200) toward the wearer or provided in the accommodation space (310).

The IoT-based smart thermal wear may include a heating element (500) accommodated in the heating element accommodation pocket (400) and provided so that the heating element (500) is input into or output from the heating element accommodation pocket (400).

The IoT-based smart thermal wear may include a power supply unit (600) that supplies power to the heating element (500).

The IoT-based smart thermal wear may include a power accommodation pocket (700) disposed in the outer member (100) or the inner member (200) so that the power supply unit (600) is accommodated therein to be input thereinto or output therefrom.

The IoT-based smart thermal wear may include a wire guide member (800) that connects the power of the power supply unit (600) to the heating element (500).

The IoT-based smart thermal wear may include a controller (900) that turns on or off the power supply unit (600) or transmit a strength control signal.

The controller (900) may further include an adjustment switch (910) to turn on or off the power supply unit (60), the adjustment switch (910) may include a casing (911) forming an external shape that a user grips with one hand and a button switch (912) disposed on a front portion of the casing (911), and a surface of the button switch (912) may be provided with a protrusion mark (912a) so that the user grasps a position of the heating element (500) using a tactile sense.

The controller (900) may further include a first communication module (920), the IoT-based smart thermal wear may further comprise a user terminal (H) in which a second communication module (930) and an application (940) are installed to interface with the first communication module (920), and information input through the application (940) by the user may be transmitted to the controller (900) through the first and second communication modules (920, 930) so that the controller (900) adjusts the power supply unit (600).

The heating element (500) may be provided with a planar heating element (510) formed by weaving a carbon yarn (511) in a zigzag shape between weft yarn and warp yarn by weaving the weft yarn and the warp yarn in a single or double manner and a heating cover material (520) that surrounds the planar heating element (510), an adapter hole (521) may be provided in the heating cover material (520) so that a direct current (DC) current is supplied to the carbon yarn (511), a power line connected from the power supply unit (600) may be provided to pass through the adapter hole (521) and supply a current of the power supply unit (600) to the carbon yarn (511), and the heating cover material (520) and the planar heating element (510) may be quilted and fixed to each other.

The planar heating element (510) may be further provided with an adapter (521) to detachably connect the carbon yarn (511) and the power line to each other toward the adapter hole (521).

The controller (900) may further includes a temperature detection unit (950) attached to the inner member (200) to detect a temperature of the wearer, is provided to transmit, to the user terminal (H), information on the temperature collected by the temperature detection unit (950), and is provided to transmit an ON/OFF signal to the power supply unit (600) by comparing the information on the temperature collected by the temperature detection unit (950) with a threshold temperature input to the controller (900), and whether the carbon yarn (511) and the wire are disconnected may be displayed on a screen of the application (940) of the user terminal by comparing the information on the temperature collected by the temperature detection unit (950) with a driving time of the power supply unit (600).

The application (940) may display, on the screen, a temperature generated by the heating element (500), a residual amount of the power supply unit (600), and a replacement time of the power supply unit (600), and the controller (900) may transmit the OFF signal to the power supply unit (600) using information of an external temperature or external weather system connected to the application (940).

The planar heating element (510) may be provided with a first heating element (531) accommodated in the heating element accommodation pocket (400) on the back of the wearer to generate heat on the back and a plurality of second heating elements (532) accommodated in the heating element accommodation pocket (400) to generate heat on a side and an abdomen of the wearer, the first heating element (531) and the second heating elements (532) may be separated from the adapter (521) to prevent damage caused by washing and the power supply unit (600) may be separated from the power accommodation pocket (700), an inlet of the heating element accommodation pocket (400) is provided with a heating element locking unit (410) as a VELCRO® (e.g., hook and loop fastener) or snap button, an inlet of the power accommodation pocket (700) is provided with a power locking unit (710) as a VELCRO® or snap button, and the wire guide member (800) is further provided with a VELCRO® or snap button to fix the wire to the outer member 100 or the inner member 200.

Advantageous Effects

Accordingly, the present invention provides an IoT-based smart thermal wear.

First, the IoT-based smart thermal wear includes a thermal member to maintain warmth to increase work efficiency of a wearer and reduce the risk of disaster and thus efficiently adjust a temperature while linked with a smart device.

Second, an outer member (100) is provided in which arm insertion holes (110) are arranged on left and right sides and a neck insertion hole (120) is formed at a center of an upper portion thereof and which is made of a fabric material so that the outer member (100) is opened or closed by an opening or closing unit (130) from top to bottom at a central position, an inner member (200) is provided in which the inner member (200) has the size and structure corresponding to the outer member (100) and is coupled to the outer member (100) inside the outer member (100) and which is made of a fabric material so that the inner member (200) is in contact with the underwear or the skin of the wearer, a heat insulating filler (300) is provided which fills an accommodation space (310) that is a space formed in the back and front of the wearer between the outer member (100) and the inner member (200), a heating element accommodation pocket (400) is provided which is disposed in the inner member (200) toward the wearer or provided in the accommodation space (310), a heating element (500) is provided which is accommodated in the heating element accommodation pocket (400) and may be input into or output from the heating element accommodation pocket (400), a power supply unit (600) is provided which supplies power to the heating element (500), a power accommodation pocket (700) is provided which is disposed in the outer member (100) or the inner member (200) so that the power supply unit (600) may be input thereinto or output therefrom, a wire guide member (800) is provided which connects the power of the power supply unit (600) to the heating element (500), and a controller (900) is provided which turns on or off the power supply unit (600) or transmits a strength control signal, and thus the IoT-based smart thermal wear is convenient to wash, lightweight, and efficient.

Third, an adjustment switch (910) linked with the controller (900) includes a casing (911) forming an external shape that a user may grip with one hand and a button switch (912) disposed on a front portion of the casing (911), a surface of the button switch (912) is provided with a protrusion mark (912a) so that the user may grasp a position of the heating element (500) using a tactile sense and thus manipulation thereof is efficient, and the controller (900) adjusts the power supply unit (600) while linked with the smart device through the first and second communication modules (920) and (930), and thus use thereof is efficient.

Meanwhile. the effects obtained in the present invention are not limited to the effects described above, and other effects not described will be clearly understood by those skilled in the art to which the present invention pertains from the following description.

DESCRIPTION OF DRAWINGS

The following drawings attached to the present specification illustrate an embodiment of the present invention and serve to further understand the technical spirit of the present invention together with the detailed description of the present invention, and thus the present invention should not be construed as being limited only to the matters described in such drawings.

FIGS. 4 to 8 are views for describing a heat insulating filler, a carbon fiber, an adjustment switch, a wire guide member, and a controller of the IoT-based smart thermal wear according to the embodiment of the present invention.

MODES OF THE INVENTION

Specific structural or functional descriptions of embodiments according to the concept of the present invention disclosed in the present specification are merely exemplified for describing the embodiments according to the concept of the present invention, and the embodiments according to the concept of the present invention may be implemented in various forms and are not limited to the embodiments described in the present specification.

Since the embodiments according to the concept of the present invention may be variously changed and may have various forms, the embodiments will be illustrated in the drawings and described in detail in the present specification. However, the embodiments according to the concept of the present invention are not intended to be limited to specific disclosed forms, and include all changes, equivalents, and substitutes included in the spirit and scope of the present invention.

FIGS. 1 to 4 are views for describing a configuration of an Internet of things (IoT)-based smart thermal wear according to an embodiment of the present invention, and FIGS. 4 to 8 are views for describing a heat insulating filler, a carbon fiber, an adjustment switch, a wire guide member, and a controller of the IoT-based smart thermal wear according to the embodiment of the present invention.

Figure 1:
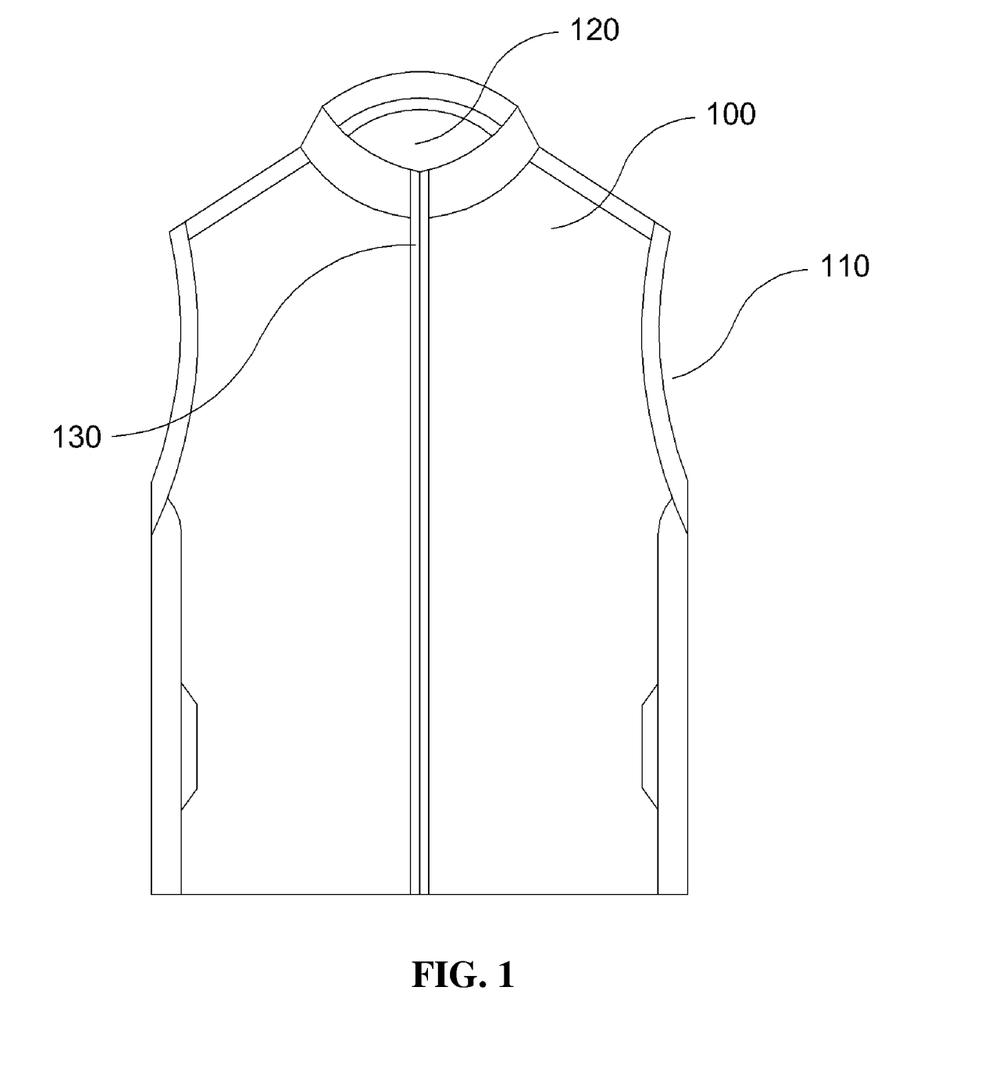
FIGS. 1 to 4 are views for describing a configuration of an Internet of things (IoT)-based smart thermal wear according to an embodiment of the present invention.
Figure 2:
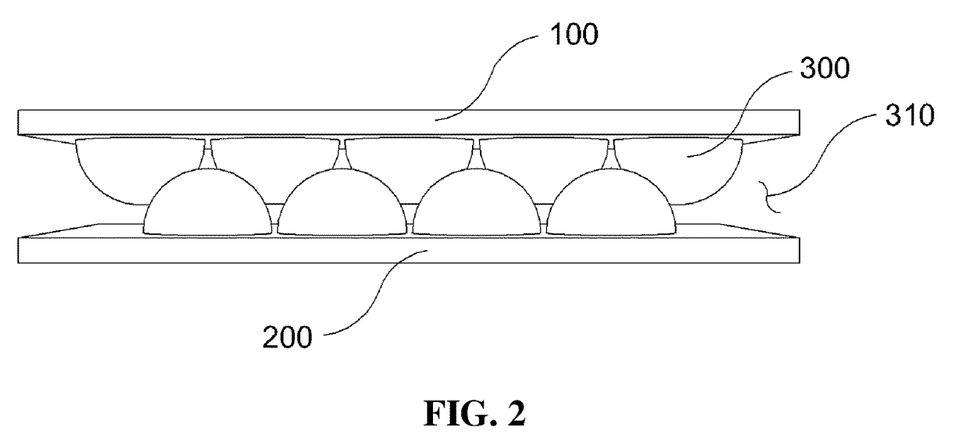
Figure 3:
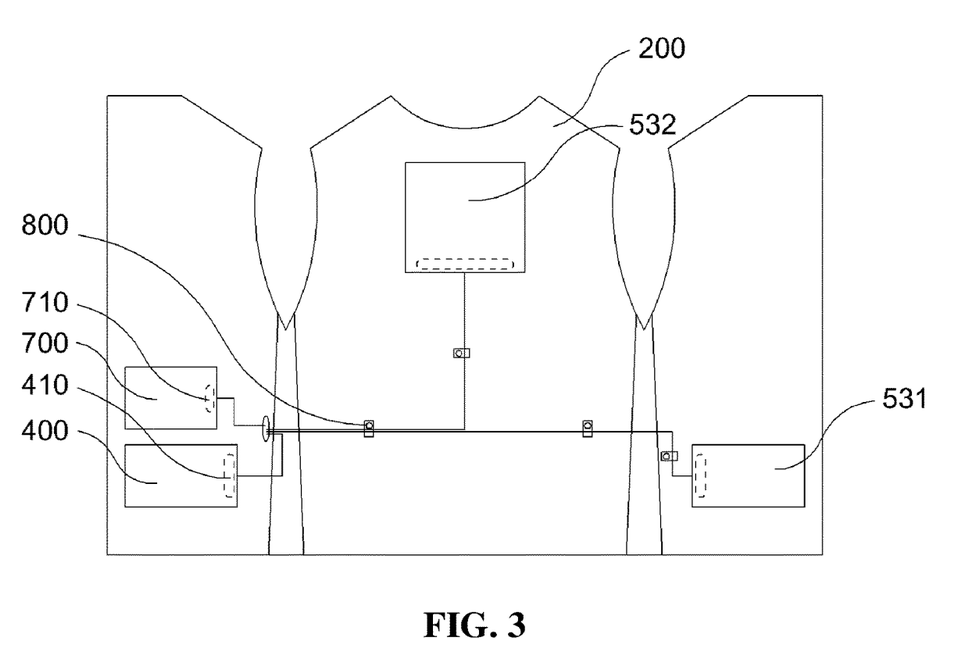
Figure 4:
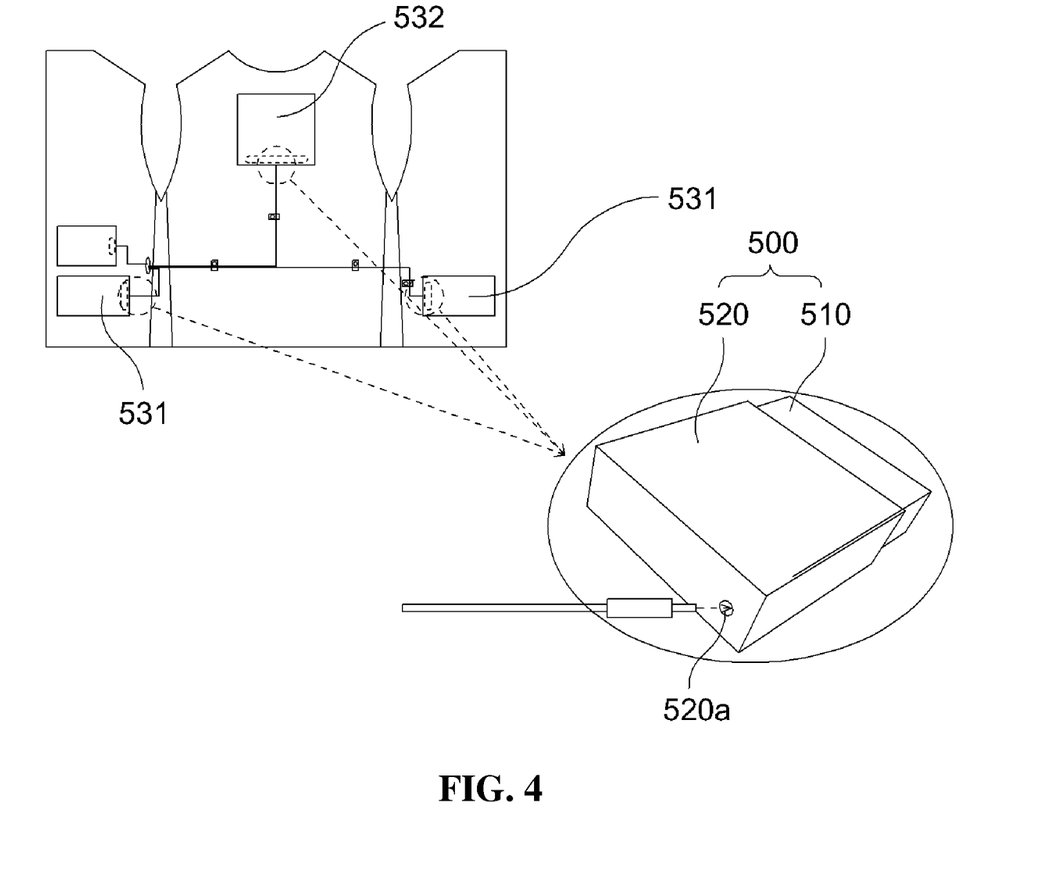
Figure 5:
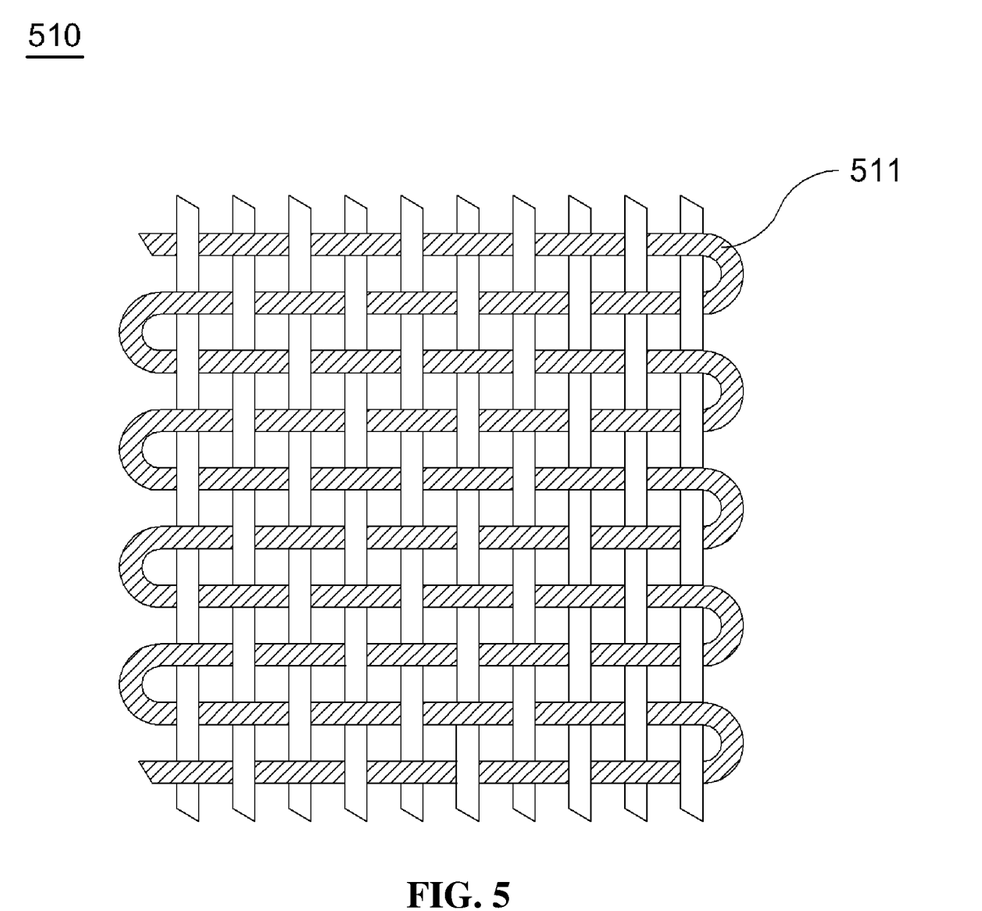

In the IoT-based smart thermal wear according to the embodiment of the present invention, first, as illustrated in FIG. 1 or 2, an outer member 100 is provided in which arm insertion holes 110 are arranged on left and right sides and a neck insertion hole 120 is formed at a center of an upper portion thereof and which is made of a fabric material so that the outer member 100 is opened or closed by an opening or closing unit 130 from top to bottom at a central position, an inner member 200 is provided in which the inner member 200 has a size and structure corresponding to the outer member 100 and is coupled to the outer member 100 inside the outer member 100 and which is made of a fabric material so that the inner member 200 is in contact with underwear or a skin of the wearer, thereby forming a clothing form, and an accommodation space 310 is formed in back and front of the wearer between the outer member 100 and the inner member 200 so that the accommodation space 310 is filled with a heat insulating filler 300.

Here, the heat insulating filler 300 may be provided with a woolen material that has a high air content and is a light material.

Further, a heating element accommodation pocket 400 is disposed in the inner member 200 toward the wearer or is provided in the accommodation space 310, and thus a heating element 500 is configured such that the heating element 500 may be accommodated in the heating element accommodation pocket 400 and may be input into or output from the heating element accommodation pocket 400.

Here, a power accommodation pocket 700 disposed in the outer member 100 or the inner member 200 is configured such that a power supply unit 600 that supplies power to the heating element 500 may be input thereinto or output therefrom.

Further, one side of a wire guide member 800 is fixed to the outer member 100 or the inner member 200 so that the power of the power supply unit 600 may be connected to the heating element 500 through a wire 810, and the wire 810 may be fixed using a snap button or VELCRO®.

Here, a controller 900 is adapted to turn on or off the power supply unit 600 or transmit a strength control signal.

Figure 6:
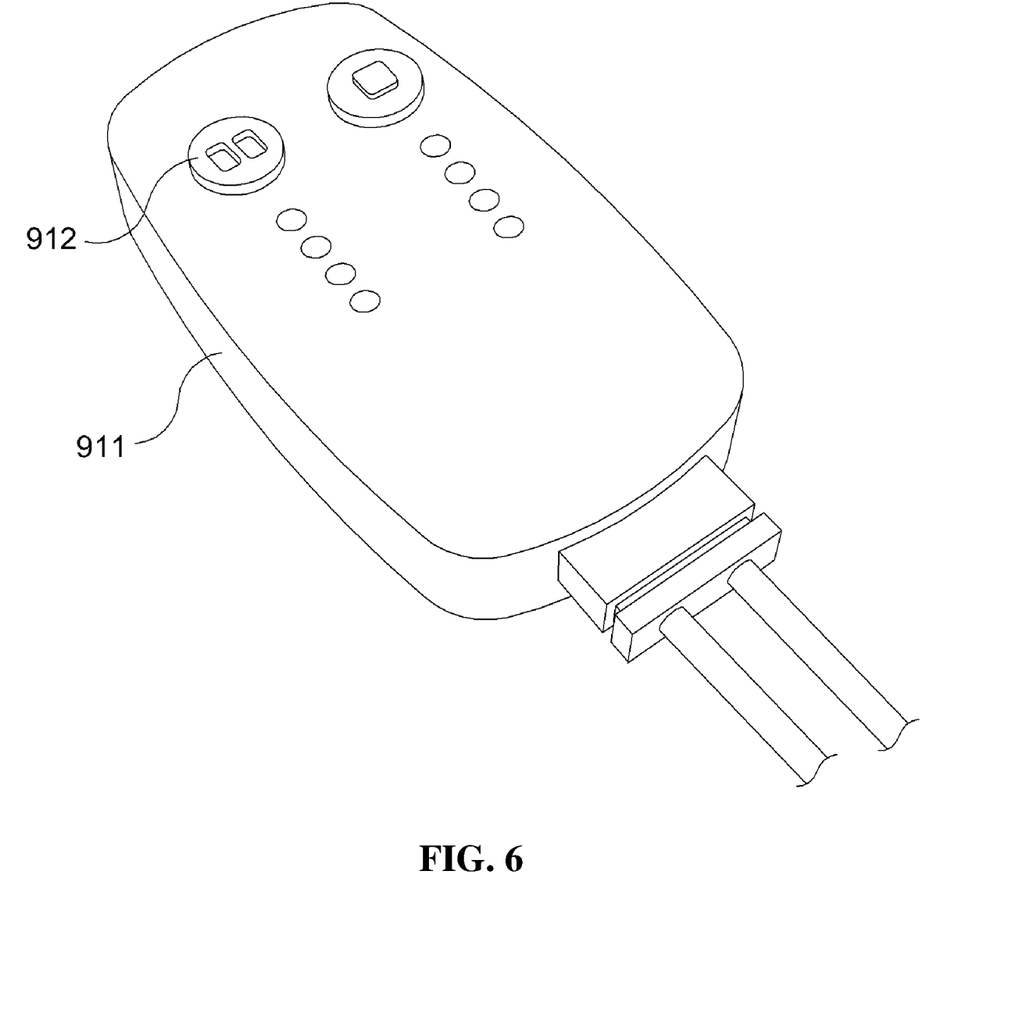
Figure 7:
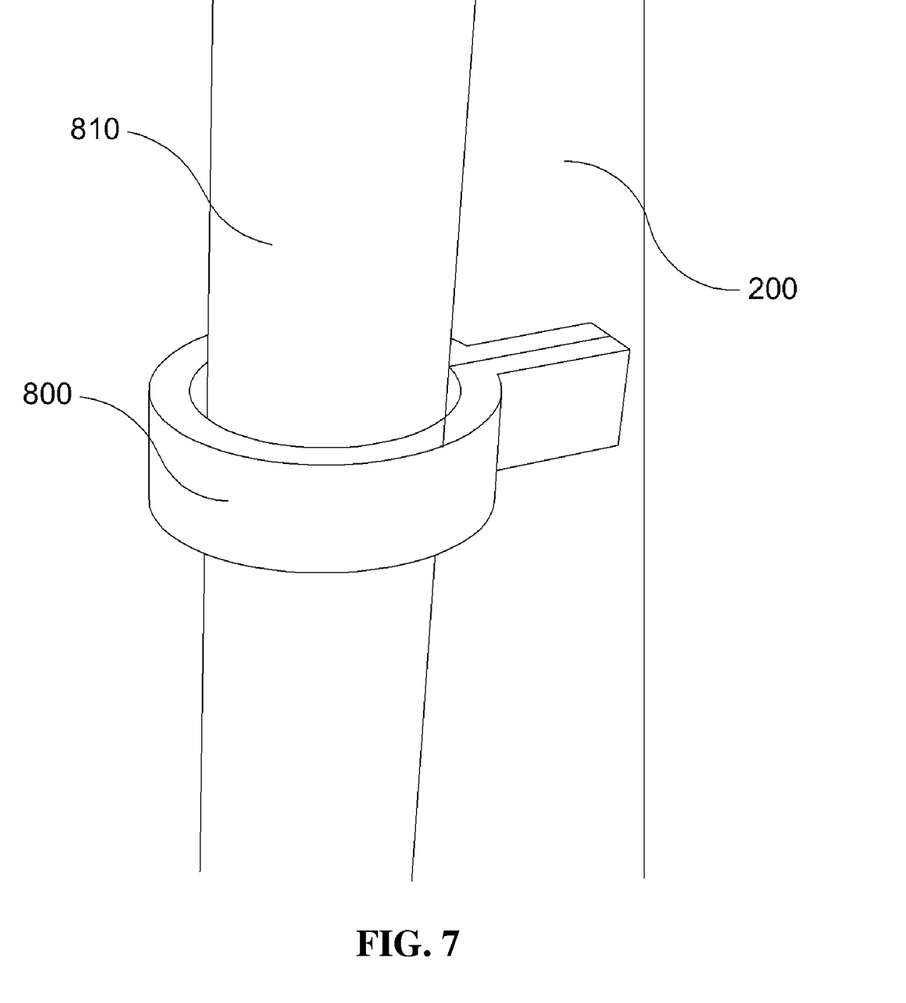

In this case, as illustrated in FIG. 6, the controller 900 further includes an adjustment switch 910 that turns on or off the power supply unit 600, and the adjustment switch 910 includes a casing 911 forming an external shape that a user may grip with one hand and a button switch 912 disposed on a front portion of the casing 911.

In this case, a surface of the button switch 912 is provided with a protrusion mark 912a or a recessed mark 912b so that the user may grasp a position of the heating element 500 using a tactile sense.

Further, the controller 900 further includes a first communication module 920 and the IoT-based smart thermal wear further includes a user terminal H in which a second communication module 930 and an application 940 are installed to interface with the first communication module 920, wherein information input by the user through the application 940 is transmitted to the controller 900 through the first and second communication modules 920 and 930 so that the controller 900 adjusts the power supply unit 600.

Meanwhile, in the heating element 500, weft yarn and warp yarn are woven single or double, a carbon yarn 511 is woven in a zigzag shape between the weft yarn and the warp yarn, and thus a planar heating element 510 is formed, and a heating cover material 520 is provided to surround the planar heating element 510.

Here, the heating cover material 520 is provided with an adapter hole 521 to supply a direct current (DC) current to the carbon yarn 511, a power line connected from the power supply unit 600 passes through the adapter hole 521 and supplies the current of the power supply unit 600 to the carbon yarn 511, and the heating cover material 520 and the planar heating element 510 are quilted and fixed to each other to form a light and thin planar heating element to reduce a sense of bulkiness and a sense of weight when the wear is worn.

In this case, the planar heating element 510 may be further provided with an adapter 521 to detachably connect the carbon yarn 511 and the power line to each other in a direction of the adapter hole 521, so that the wire 810 may be easily separated.

Figure 8:
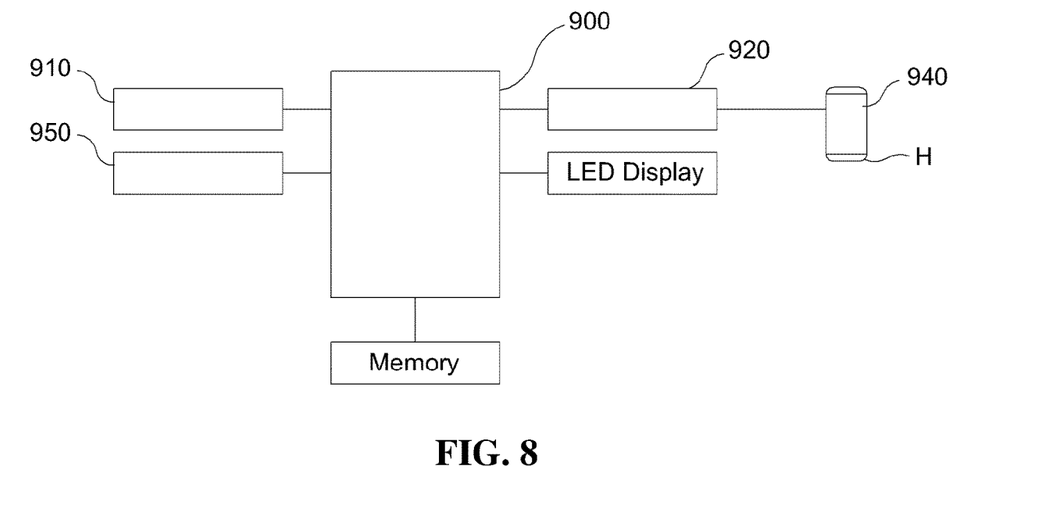

Meanwhile, as illustrated in FIG. 8, the controller 900 further includes a temperature detection unit 950 attached to the inner member 200 to detect a temperature of the wearer, is provided to transmit, to the user terminal H, information on the temperature collected by the temperature detection unit 950, and is provided to transmit an ON/OFF signal to the power supply unit 600 by comparing the information on the temperature collected by the temperature detection unit 950 with a threshold temperature input to the controller 900.

In this case, whether the carbon yarn 511 and the wire are disconnected is displayed on a screen of the application 940 of the user terminal by comparing the information on the temperature collected by the temperature detection unit 950 with a driving time of the power supply unit 600.

Further, in this case, the application 940 is provided to display, on the screen, a temperature generated by the heating element 500, a residual amount of the power supply unit 600, and a replacement time of the power supply unit 600, and the controller 900 is provided to transmit the OFF signal to the power supply unit 600 by using information of an external temperature or external weather system connected to the application 940.

Meanwhile, the planar heating element 510 is provided with a first heating element 531 accommodated in the heating element accommodation pocket 400 on the back of the wearer to generate heat on the back and a plurality of second heating elements 532 accommodated in the heating element accommodation pocket 400 to generate heat on a side and an abdomen of the wearer, wherein the first heating element 531 and the second heating elements 532 may be separated from the adapter 521 to prevent damage caused by washing, the power supply unit 600 may be separated from the power accommodation pocket 700, and thus the IoT-based smart thermal wear is convenient to wash.

Further, an inlet of the heating element accommodation pocket 400 is provided with a heating element locking unit 410 as a VELCRO® or snap button, an inlet of the power accommodation pocket 700 is also provided with a power locking unit 710 as a VELCRO® or snap button, and the wire guide member 800 is further provided with a VELCRO® or snap button to fix the wire to the outer member 100 or the inner member 200.

Using the IoT-based smart thermal wear according to the embodiment of the present invention, the wear includes the thermal member to maintain warmth to increase work efficiency of the wearer and reduce the risk of disaster. Further, the outer member 100 is provided in which arm insertion holes 110 are arranged on left and right sides and the neck insertion hole 120 is formed at the center of an upper portion thereof and which is made of a fabric material so that the outer member 100 is opened or closed by an opening or closing unit 130 from top to bottom at the central position while linked with a smart device to efficiently adjust a temperature, the inner member 200 is provided in which the inner member 200 has the size and structure corresponding to the outer member 100 and is coupled to the outer member 100 inside the outer member 100 and which is made of a fabric material so that the inner member 200 is in contact with the underwear or the skin of the wearer, the heat insulating filler 300 is provided which fills the accommodation space 310 that is a space formed in the back and front of the wearer between the outer member 100 and the inner member 200, the heating element accommodation pocket 400 is provided which is disposed in the inner member 200 toward the wearer or provided in the accommodation space 310, the heating element 500 is provided which is accommodated in the heating element accommodation pocket 400 and may be input into or output from the heating element accommodation pocket 400, the power supply unit 600 is provided which supplies power to the heating element 500, the power accommodation pocket 700 is provided which is disposed in the outer member 100 or the inner member 200 so that the power supply unit 600 may be input thereinto or output therefrom, the wire guide member 800 is provided which connects the power of the power supply unit 600 to the heating element 500, and the controller 900 is provided which turns on or off the power supply unit 600 or transmits a strength control signal, and thus the IoT-based smart thermal wear is convenient to wash, lightweight, and efficient. The adjustment switch 910 linked with the controller 900 includes the casing 911 forming an external shape that the user may grip with one hand and the button switch 912 disposed on a front portion of the casing 911, a surface of the button switch 912 is provided with the protrusion mark 912*a* so that the user may grasp a position of the heating element 500 using a tactile sense, and thus manipulation thereof is efficient. The controller 900 adjusts the power supply unit 600 while linked with the smart device through the first and second communication modules 920 and 930, and thus use thereof is efficient.

Hereinabove, the present invention has been described through the embodiment. However, the above embodiment merely illustratively describes the technical spirit of the present invention, and those skilled in the art should understand that various changes are possible without departing from the technical spirit of the present invention. Thus, the protection scope of the present invention should be construed not by the specific embodiment but by the appended claims, and all technical spirits within the corresponding scope should be construed as being included in the scope of the present invention.

The invention claimed is:

1. An Internet of Things (IoT)-based smart thermal wear comprising:
    an outer member in which arm insertion holes are arranged on left and right sides thereof and a neck insertion hole is formed at a center of an upper portion thereof and which is made of a fabric material, and the outer member is configured to be opened or closed by an opening or closing unit from top to bottom at a central position;
    an inner member in which the inner member has a size and structure corresponding to the outer member and is coupled to the outer member inside the outer member and which is made of a fabric material, and the inner member is configured to be in contact with underwear or a skin of a wearer;
    a heat insulating filler configured to fill an accommodation space that is a space formed in back and front of the wearer between the outer member and the inner member;

a heating element accommodation pocket disposed in the inner member toward the wearer or provided in the accommodation space;

a heating element accommodated in the heating element accommodation pocket and disposed in a flat surface so that the heating element is input into or output from the heating element accommodation pocket;

a power supply unit having a universal serial bus (USB)-type rechargeable battery to supply direct current (DC) power to the heating element;

a power accommodation pocket disposed in the outer member or the inner member, wherein the power supply unit is accommodated therein to be input thereinto or output therefrom;

a wire guide member configured to connect the power of the power supply unit to the heating element through a wire; and a controller configured to turn on or off the power supply unit or transmit a strength control signal, wherein the heating element comprises:

a planar heating element formed by weaving a carbon yarn in a zigzag shape between weft yarn and warp yarn by weaving the weft yarn and the warp yarn in a single or double manner; and a heating cover material configured to surround the planar heating element, wherein an adapter hole is provided in the heating cover material so that a DC current is supplied to the carbon yarn, a power line connected from the power supply unit is provided to pass through the adapter hole and supply a current of the power supply unit to the carbon yarn, and the heating cover material and the planar heating element are quilted and fixed to each other.

2. The IoT-based smart thermal wear of claim 1, wherein the controller comprises an adjustment switch to turn on or off the power supply unit, wherein the adjustment switch comprises a casing having an external shape configured to enable a user to grip the casing with one hand and a button switch disposed on a front portion of the casing, and wherein a surface of the button switch includes a protrusion mark so that the user determines a position of the heating element using a tactile sense.

3. The IoT-based smart thermal wear of claim 2, wherein the controller further comprises a first communication module, and wherein the IoT-based smart thermal wear further comprises a user terminal in which a second communication module and an application are installed to interface with the first communication module, and information input through the application by the user is transmitted to the controller through the first and second communication modules and the controller adjusts the power supply unit.

4. The IoT-based smart thermal wear of claim 1, wherein the planar heating element comprises an adapter to detachably connect the carbon yarn and the power line to each other toward the adapter hole.

5. The IoT-based smart thermal wear of claim 1, wherein the controller comprises a temperature detection unit attached to the inner member to detect a temperature of the wearer, wherein the temperature detection unit is configured to transmit, to a user terminal, information on the temperature detected by the temperature detection unit, and to transmit an ON/OFF signal to the power supply unit by comparing the information on the temperature detected by the temperature detection unit with a threshold temperature input to the controller, and wherein whether the carbon yarn and the wire are disconnected is displayed on a screen of an application of the user terminal by comparing the information on the temperature collected by the temperature detection unit with a driving time of the power supply unit.

6. The IoT-based smart thermal wear of claim 5, wherein the application is configured to display, on the screen, a temperature generated by the heating element, a residual amount of the power supply unit, and a replacement time of the power supply unit, and wherein the controller transmits the ON/OFF signal to the power supply unit using information of an external temperature or external weather system connected to the application.

7. The IoT-based smart thermal wear of claim 1, wherein the planar heating element comprises a first heating element accommodated in the heating element accommodation pocket on the back of the wearer to generate heat on the back and a plurality of second heating elements accommodated in the heating element accommodation pocket to generate heat on a side and an abdomen of the wearer, wherein the first heating element and the plurality of second heating elements are able to be separated from an adapter of the planar heating element to prevent damage caused by washing, and the power supply unit is able to be separated from the power accommodation pocket, and wherein an inlet of the heating element accommodation pocket includes a heating element locking unit, an inlet of the power accommodation pocket includes a power locking unit, and the wire guide member comprises a hook and loop fastener or a snap button to fix the wire to the outer member or the inner member.

8. An Internet of Things (IoT)-based smart thermal wear comprising:

an outer member in which arm insertion holes are arranged on left and right sides thereof and a neck insertion hole is formed at a center of an upper portion thereof and which is made of a fabric material, and the outer member is configured to be opened or closed by an opening or closing unit from top to bottom at a central position;

an inner member in which the inner member has a size and structure corresponding to the outer member and is coupled to the outer member inside the outer member and which is made of a fabric material, and the inner member is configured to be in contact with underwear or a skin of a wearer;

a heat insulating filler configured to fill an accommodation space that is a space formed in back and front of the wearer between the outer member and the inner member;

a heating element accommodation pocket disposed in the inner member toward the wearer or in the accommodation space;

a heating element accommodated in the heating element accommodation pocket and disposed in a flat surface so that the heating element is input into or output from the heating element accommodation pocket;

a power supply unit having a universal serial bus (USB)-type rechargeable battery to supply direct current (DC) power to the heating element;

a power accommodation pocket disposed in the outer member or the inner member, wherein the power supply unit is accommodated therein to be input thereinto or output therefrom;

a wire guide member configured to connect the power of the power supply unit to the heating element through a wire; and a controller configured to turn on or off the power supply unit or transmit a strength control signal, wherein the heating element comprises a first heating element accommodated in the heating element accommodation pocket on the back of the wearer to generate heat on the back and a plurality of second heating elements accommodated in the heating element accommodation pocket to generate heat on a side and an abdomen of the wearer, wherein the first heating element and the plurality of second heating elements are able to be separated from an adapter of the heating element to prevent damage caused by washing, and the power supply unit is able to be separated from the power accommodation pocket, wherein an inlet of the heating element accommodation pocket includes a heating element locking unit, an inlet of the power accommodation pocket includes a power locking unit, and the wire guide member comprises a hook and loop fastener or a snap button to fix the wire to the outer member or the inner member, and wherein, the heating element locking unit and the power locking unit are each provided as a hook and loop fastener or a snap button.

* * * * *